United States Patent [19]

Marchetti

[11] Patent Number: 4,895,247
[45] Date of Patent: Jan. 23, 1990

[54] CONVEYOR TABLE FOR CONNECTING OPERATING UNITS OF A CARDBOARD BOX PACKING STATION

[76] Inventor: Augusto Marchetti, Via Caccialepori, 35, 20148 Milano, Italy

[21] Appl. No.: 177,137

[22] Filed: Apr. 4, 1988

[30] Foreign Application Priority Data

Apr. 8, 1987 [IT] Italy ............................. 20023 A/87

[51] Int. Cl.$^4$ ........................................... B65G 13/071
[52] U.S. Cl. ..................................... 198/790; 198/788
[58] Field of Search ............... 198/782, 788, 789, 790

[56] References Cited

U.S. PATENT DOCUMENTS

| | | | |
|---|---|---|---|
| 3,180,480 | 4/1965 | Preston | 198/790 |
| 3,263,797 | 8/1966 | Lutes | 198/789 |
| 3,643,789 | 2/1972 | Werntz | 198/790 |
| 3,905,470 | 9/1975 | Gebhardt | 198/782 X |
| 4,103,769 | 8/1978 | Jorgensen | 198/789 X |
| 4,193,492 | 3/1980 | Hammond | 198/789 X |
| 4,308,946 | 1/1982 | Ouellette | 198/790 |
| 4,488,639 | 12/1984 | Vogt et al. | 198/781 |

FOREIGN PATENT DOCUMENTS 3620740  1/1987  Fed. Rep. of Germany ...... 198/790

Primary Examiner—David A. Bucci
Assistant Examiner—Lyle Kimms
Attorney, Agent, or Firm—Cushman, Darby & Cushman

[57] ABSTRACT

A conveyor table connecting the various operating units of a cardboard box-packing station includes a series of idling rollers designed to support the boxes. To the conveyor table is releasably associated a motorization unit which includes a series of motorized rollers which can be coupled by friction to the idling rollers.

5 Claims, 4 Drawing Sheets

CONVEYOR TABLE FOR CONNECTING OPERATING UNITS OF A CARDBOARD BOX PACKING STATION

BACKGROUND OF THE INVENTION

The present invention relates to a connecting conveyor table between the various operating units of a cardboard box-packing station.

As is known, a cardboard box-packing station comprises several operating units, each of which performs on the box a certain number of operations to arrive at the final result consisting of a packed box ready for distribution.

The various machines described are connected one after another by appropriate conveyor tables by means of which the boxes pass in a continuous process from one machine to the next.

Known connecting tables consist of a frame equipped with means for support on the floor and means of connecting at least one of the connected units and transversal idling rollers which support the boxes and aid the transfer thereof from one unit to the next.

Each box advances by gravity (if the table is inclined), or by the pushing effect of the following box or by manual pushing.

The above described solutions are not always economical, it being sometimes preferable to move the boxes rapidly from one unit to the next.

At the same time, it is not opportune to provide special motorized elements to be used to replace the simple idling roller conveyors because a solution of this kind would oblige the builder to diversify its production, in other words produce conveyor tables with idling rollers or motorized conveyors with the resulting increase in production and storage costs.

SUMMARY OF THE INVENTION

In view this state of the art, the object of the present invention is to accomplish a connecting conveyor table between the various operating units of a packing station operating with cardboard boxes which would be quickly convertible from a simple supporting conveyor table to a motorized conveyor table (or vice versa) with no need of complete replacement of either of the conveyor tables.

In accordance with the invention that object is achieved by a conveyor table connecting the various operating units of a cardboard box-packing station comprising a frame equipped with idling rollers, means of support on the floor and means of connection to at least one of the connected units characterized in that it also comprises a motorization unit for the idling rollers and a releasable coupling for the motorization unit to the frame.

The motorization unit preferably comprises a series of motorized rollers made to rotate and held in friction engagement with the idling rollers by a transmission chain supported and guided by idling rollers and idling sprockets and driven by a motor.

The motorized rollers and the idling rollers and sprockets are supported by means fitted in a turning manner on vertical plates which can extend over the entire length of the conveyor table and be made integral with transverse elements fixed to the sides of the conveyor table by suitable locking means.

The motor, together with means of connection to the drive chain, is fixed to extensions of the vertical plates.

In this arrangement, the motorization unit for the idling rollers is constrained to the conveyor table only by the transverse elements. Consequently, to bring about forced rotation of the box entrainment rollers, it is sufficient to fix to the conveyor table the transverse elements, thus completing the entire actuating assembly of the idling rollers. The reverse operation is performed to effect disassembly.

The object of avoiding diversified production of both motorized and unmotorized connecting conveyor tables has thus been achieved, permitting the manufacturer to standardize production and the user to readily choose between an unmotorized conveyor, table and a motorized one depending on the user's requirements.

BRIEF DESCRIPTION OF THE DRAWINGS

One possible form of practical accomplishment of the present invention is illustrated as a nonlimiting example in the annexed drawings wherein.

DETAILED DESCRIPTION OF THE DRAWING

Figure 1:
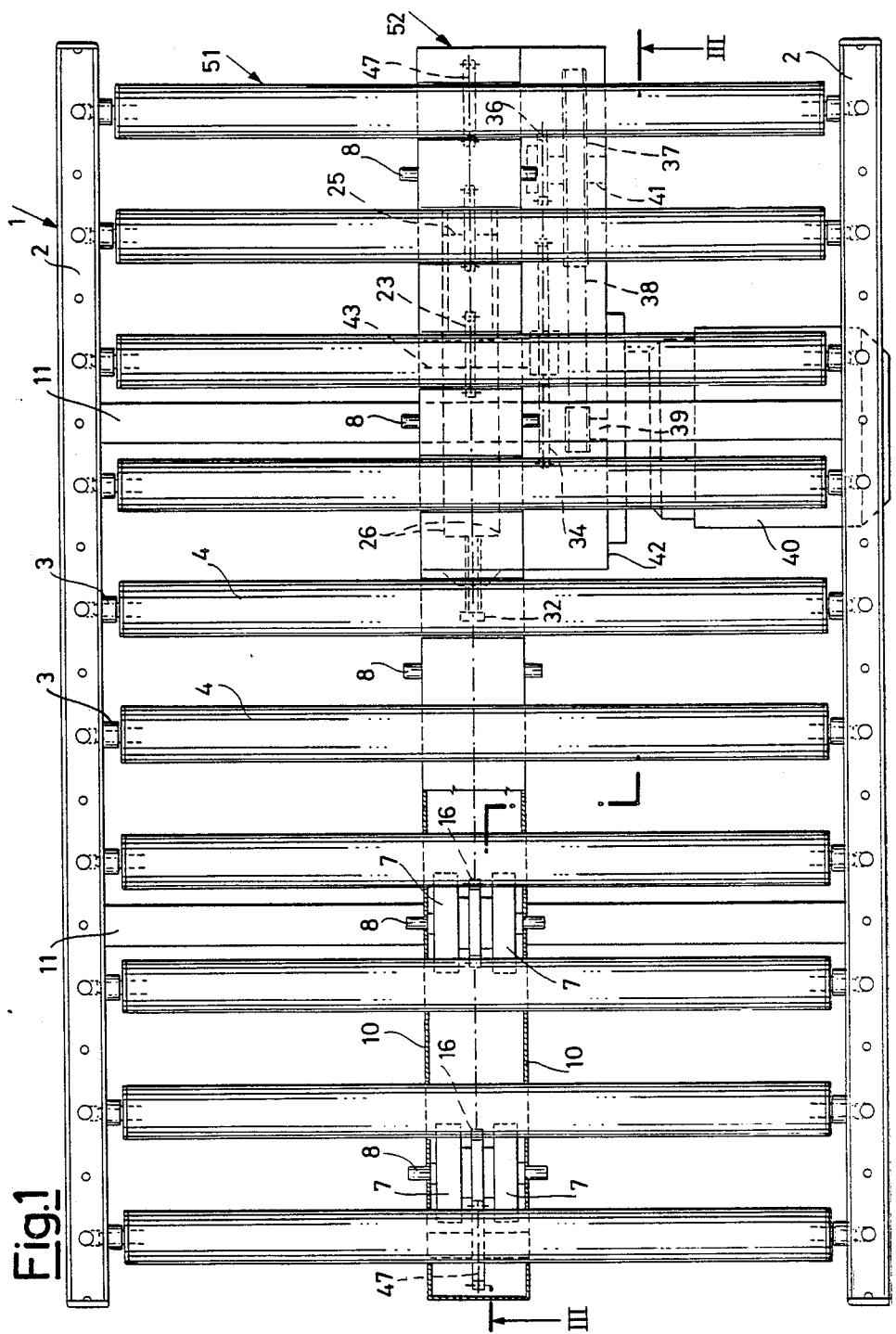
FIG. 1 shows a top plan view of a motorized connecting conveyor table for the movement of cardboard boxes in a packing station.
Figure 2:
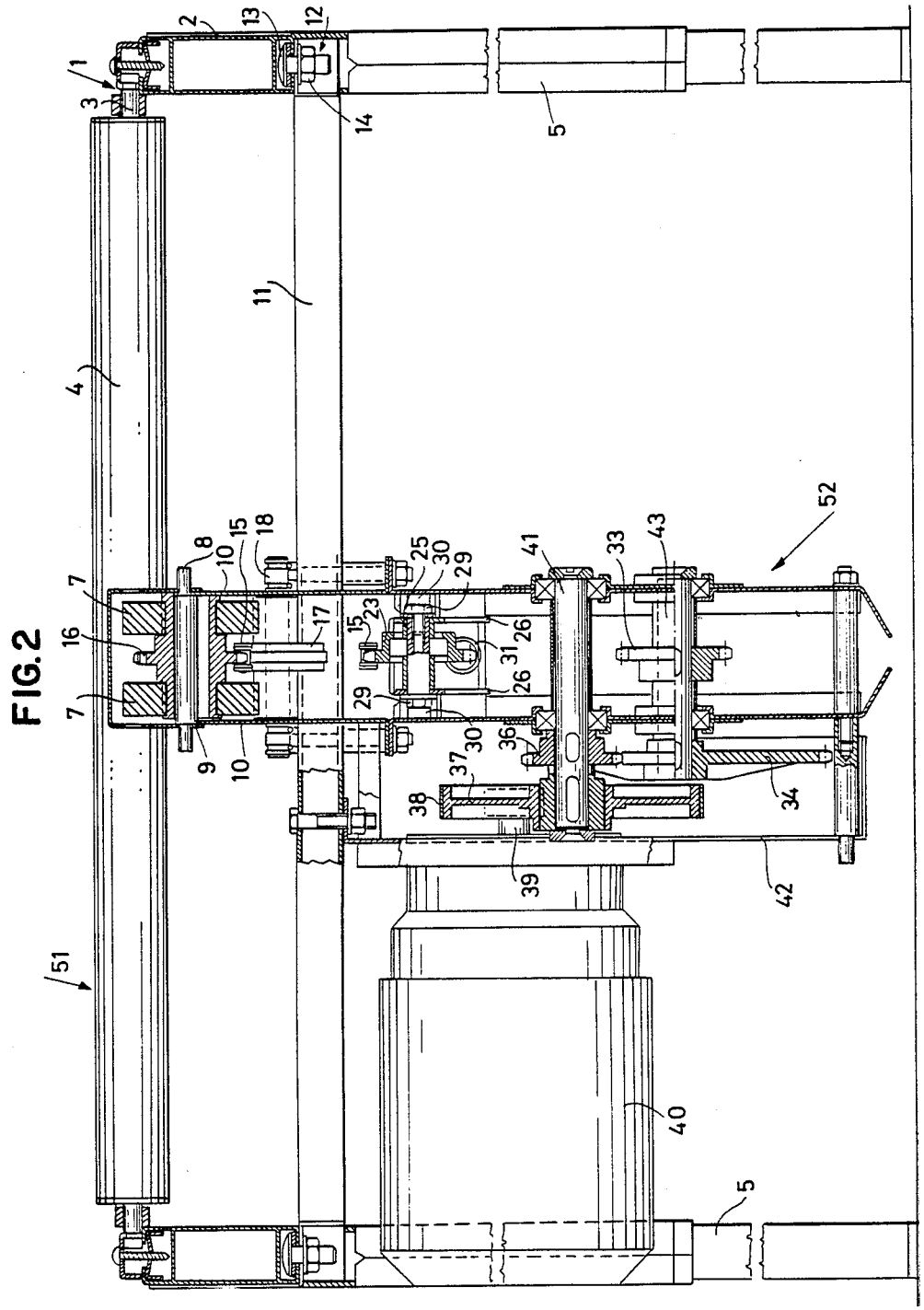
FIG. 2 shows a cross-section of the conveyor table along the line II—II of FIG. 3.
Figure 3:
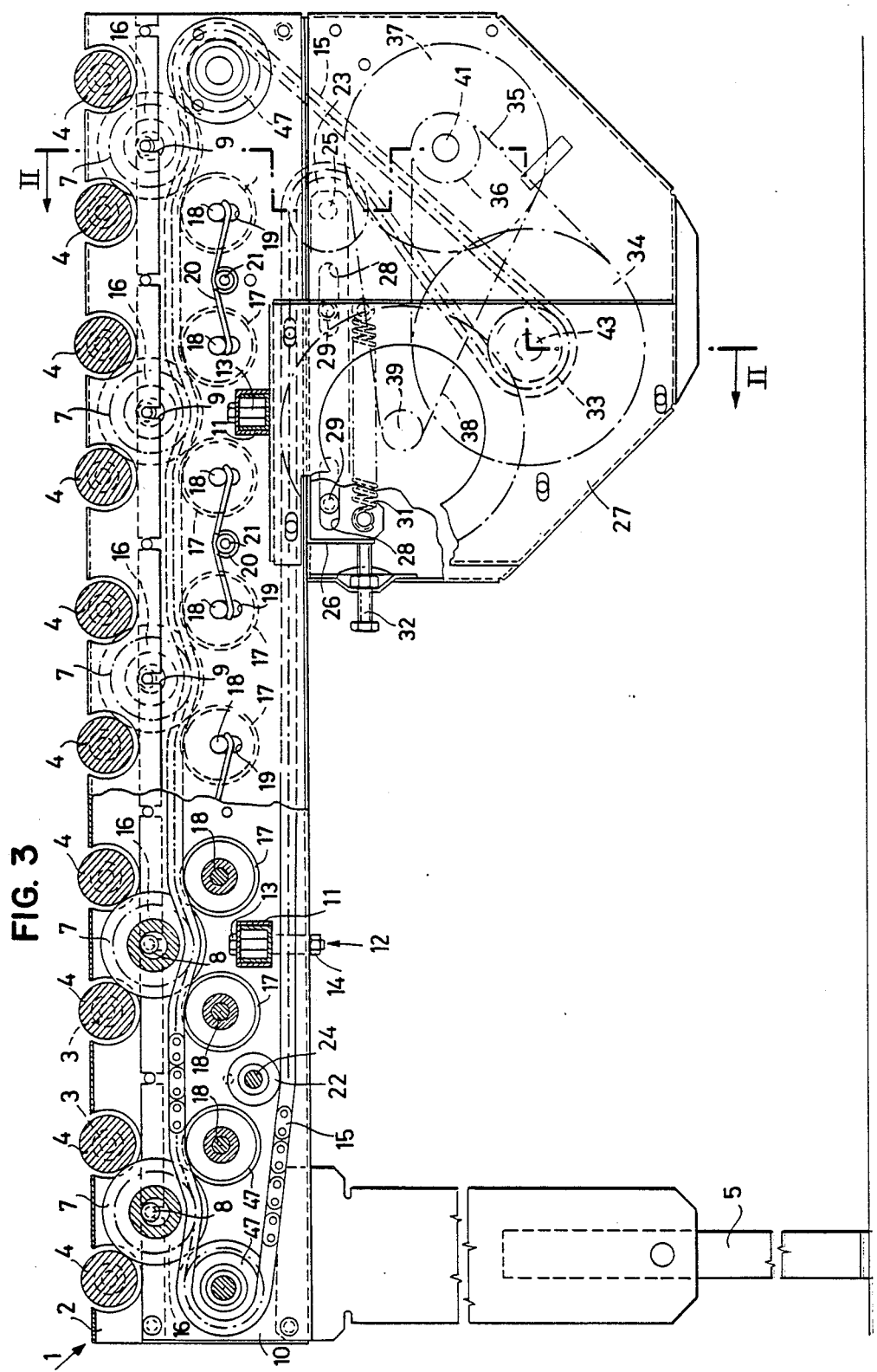
FIG. 3 shows a cross-section of the conveyor table along the line III—III of FIG. 1.

With reference to FIGS. 1-3 there is shown a connecting conveyor table 51 for movement of boxes from one operating unit to the next of a continuous packing station.

The conveyor table comprises a frame 1 consisting of side portions 2 between which are supported pins 3 on which rotate idling rollers 4 (FIG. 1). Each portion 2 comprises at least one supporting leg 5 on the floor with adjustable height (FIG. 3) and a means of connection 6 to an adjacent conveyor table (FIG. 4) or to an operating unit to be connected.

With the conveyor table 51 is associated in a releasable manner, a motorization unit 52 for the idling rollers 4 which comprises, as shown in FIG. 3, a plurality of motorized roller pairs 7 engage with the idling rollers 4, the motorized rollers 7 being arranged between two successive idling rollers 4 so that each motorized roller 7 drives a pair of idling rollers 4.

In addition, the motorized rollers 7 are fitted in a turning manner on hubs 8 supported in seats 9 made in vertical plates 10 which extend the entire length of the conveyor table.

The plates 10 are integral with transverse elements 11 fixed to the side portions 2 of the conveyor table with suitable means of locking 12 which, preferably, are bolts 13 with their tightening nuts 14.

Since the motorized rollers 7 are covered with rubber on the surface of contact with the idling rollers 4, the seats 9 of the support hubs 8 of the motorized rollers 7 have a diameter than that of the hubs 8 to permit vertical movement of the rollers 7 in order to compensate for the decrease in diameter thereof due to wear.

Each pair of motorized rollers 7 is driven by a chain 15 which is engaged with a gear 16 placed in an integral manner between the two aforesaid rollers and having a diameter smaller than that of the roller.

The chain 15 is guided and supported during rotation by a pair of end gears 47 and a plurality of intermediate idling rollers 17 arranged below the motorized rollers 7.

The idling rollers 17 are borne in a turning manner by hubs 18 inserted in seats 19 also made in the vertical plates 10. The seats 19 are elongated and allow the vertical springing of the hubs 18 due to the fact that said hubs are engaged with springs 20 which exert thrust on the hubs 18, hence also on the rollers 17, obtaining an optimal tension of the chain 15. The springs 20 are fitted on the pins 21 which are also fixed to the vertical plates 10.

The chain 15 below is tightened by a spacing roller 22 and a gear with adjustable position 23. The spacing roller 22 is supported in a turning manner by a hub 24 fixed to the plate 10 while the gear 23 is supported in a turning manner by a hub 25 fixed to angular plates 26 which in turn are constrained to run in an adjustable manner between extensions 27 of the plates 10.

The angular plates 26 have elongated windows 28 in which run bolts 29 the heads of which are forced to run in grooves 30 provided in the inner walls of the extensions 27. A spring 31 having one end constrained to said angular plates 26 and the other to the extensions 27 holds the angular plates 26 and hence the tension roller 23 in position. To increase or decrease the tension of the chain 15 the tension roller 23 is moved by acting on the spring 31. For this purpose there is provided a bolt 32 screwed into a transverse wall of an extension 27, said bolt being engaged with the angular plate 26 and causing it to traverse parallel to the plate 10 thus achieving the desired movement of the tension roller 23 and the tightening or loosening of the chain 15.

The chain 15 is wound on a first sprocket 33 which is integral with a second sprocket 34 on which is wound a second chain 35 connecting with a third sprocket 36 integral with a pulley 37 which is in turn connected by a belt 38 to a drive shaft of a motor 40.

The pulley 37 and the sprocket 36 are integral with a hub 41 supported in said extensions 27 of the plates 10. The motor 40 is however supported by a plate 42 fixed directly to one of the transverse elements 11. The sprockets 33 and 34 are integral with a hub 43 supported in the extensions 27.

All the elements described for the moving of the idling rollers 4 are supported by the vertical plates 10 and the associated extensions 27. The plates 10 are then fixed to the conveyor table only by the transversal elements 11.

Figure 4:
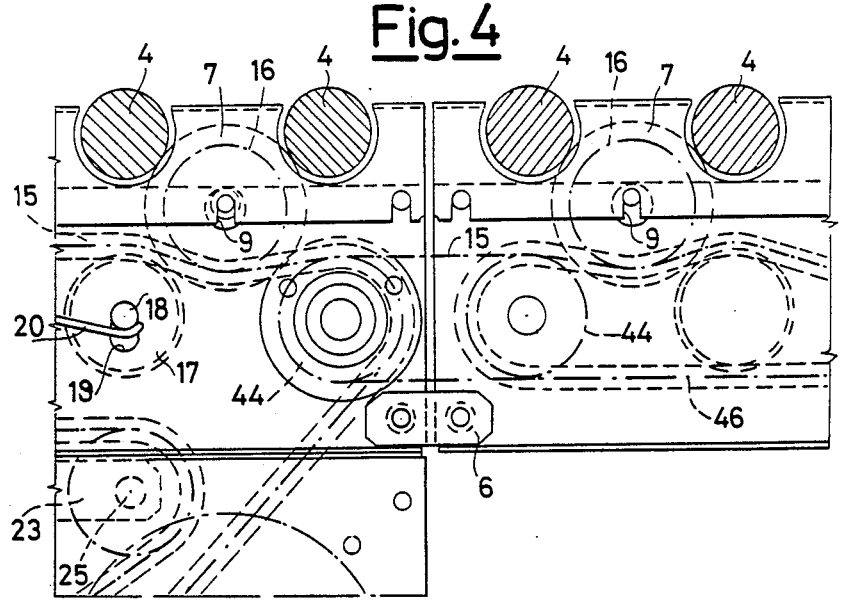
FIG. 4 shows a cross-section of a detail of the jointed area between two contiguous conveyor tables along the line IV—IV of FIG. 5.
Figure 5:
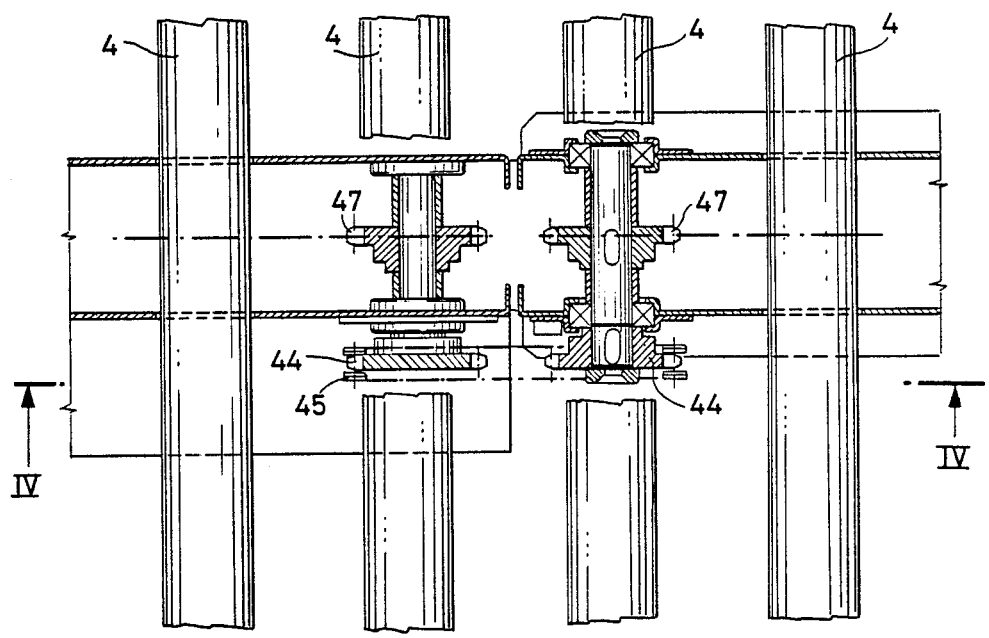
FIG. 5 shows a partially cross-sectioned top plan view of the FIG. 4 detail of the jointed area between two contiguous conveyor tables.

As shown in FIGS. 4 and 5, more conveyor tables can be brought together and coupled to cover the distance between two operating units in succession. To connect one conveyor table to the following one there are provided, as already mentioned, connectors 6.

To transmit motion to the idling rollers of the added conveyor table (provided with a unit 52 without motor 40) there are provided other sprockets 44 on one outer side of the end sprockets 47 of the conveyor tables to be connected, the sprockets being connected by a motion transmission chain 45. With the arrangement the rotation of the sprockets 47 of a first conveyor table causes rotation of the chain 45 and hence causes rotation of the corresponding sprocket and the entire motorization unit 52 of the connected conveyor table.

The conveyor table described is designed to operate as follows.

Once a conveyor table of the type described is placed in position in the packing station, to secure movement of the idling rollers 4 the electric motor 40 is started and causes rotation of the motor shaft 39.

The belt 38 fitted on the shaft 39 and on the pulley 37 produces rotation of the sprocket 36, which is integral with the pulley 37. The chain 35 which connects the sprocket 36 with the sprocket 34 causes rotation of the sprocket 33 on which is wound the chain 15, which moves the motorized rollers 7.

The chain 15 then entrains the motorized rollers 7, which cause the idling rollers 4 to rotate.

If it is desired to convert the illustrated motorized conveyor table into a conveyor table with idling rollers, the entire motorization unit is removed merely by unscrewing the bolts 13 and freeing the transversal elements 11 which support the vertical plates 10 with their extensions 27.

I claim:

1. A conveying table for connection between upstream and downstream units of a cardboard box-packing station, comprising:
    a frame for supporting the conveying table;
    a series of transversally-extending idling rollers spaced from one another along a conveying path and each journalled to said frame for rotation, for advancing a cardboard box along said path, from an upstream unit to a downstream unit of a cardboard box-packing station;
    a driving unit, including:
        a driving unit frame;
        a series of transversally-extending driven rollers spaced from one another in the longitudinal direction of said path, each of said driven rollers having a frictional driving surface and being journalled for rotation on said driving unit frame;
        said driven rollers are journaled to said frame by having hubs thereof borne in slotted openings in transversely spaced plate means of said driving unit frame, said slotted openings being elongated in such a sense as to permit said driven rollers to be pushed towards said idling rollers by said endless chain as, in turn, is pushed by said idle rollers as resiliently biased by said resilient means;
        a source of rotary power mounted on said driving unit frame;
        mechanical power transmission means transmitting rotary power from said rotary power source to said driven rollers, said mechanical power transmission means including an endless driving chain, and sprockets on said driven rollers, said driving chain entraining said sprockets; and
        a series of transversally-extending idle rollers spaced from one another in the longitudinal direction of said path, said idle rollers being journalled for rotation on said driving unit frame by journalling means including resilient means resiliently bearing said idle rollers against said endless driving chain, in a sense to resiliently press said endless driving chain into driving relation with said sprockets; and
    means readily releasably mounting said driving unit frame to said conveying table supporting frame, whereby said conveying table may easily be converted between powered and non-powered use, by mounting and demounting said driving unit, said frictional driving surfaces of said driven rollers, when said driving unit is mounted to said conveying table supporting frame being disposed in frictional driving engagement with respective of said idling rollers for power-rotating said idling rollers.

2. The conveying table of claim 1, wherein:
said source of rotary power comprises a motor mounted to said driving unit frame, and mechanical power transmission means effectively placing said motor in driving relationship to said endless chain.

3. The conveying table of claim 1, wherein:
said resilient means comprises carriage springs pinned to said transversally spaced plate means and engaging hubs of said idle rollers, which are journalled in slots in said transversally spaced plate means.

4. The conveying table of claim 1, wherein:
each said driven roller is disposed in frictional driving engagement with two of said idling rollers neighboring one another in said series in idling rollers.

5. The conveying table of claim 1, for use in an instance in which one of the upstream or downstream unit of the cardboard box-packing station is a second conveying table including a second frame for supporting the second conveying table and a second series of transversally-extending idling rollers spaced from one another along said conveying path and each journalled to said second frame for rotation, for advancing a cardboard box along said path,
said driving unit further comprising:
means for transmitting mechanical power from said source of rotary power to said second conveying table for power-rotating said second series of idling rollers.

* * * * *